2,993,075
REACTION OF SULFENYL HALIDES WITH
UNSATURATED ALDEHYDES
Samuel Allen Heininger and Gail H. Birum, Dayton, Ohio, assignors to Monsanto Chemical Company, St. Louis, Mo., a corporation of Delaware
No Drawing. Filed Feb. 21, 1957, Ser. No. 641,493
9 Claims. (Cl. 260—599)

This invention relates to aldehyde products, and more particularly provides products of the reaction of olefinic aldehydes with sulfenyl halides.

In accordance with this invention, a sulfenyl halide is reacted with an α,β-olefinic aldehyde to produce a reaction product comprising thio-substituted aldehydes.

It has been reported in the literature (Turner and Connor, J. Am. Soc. (1947), 69, 1009), that nitrobenzenesulfenyl halides do not react with olefins wherein the double bond is conjugated with a negative substituent such as a carbonyl group. Our own experiments have confirmed this finding of the non-reactivity of nitrobenzenesulfenyl halides with negatively substituted olefins. It is accordingly surprising that, as has now been found, sulfenyl halides wherein the sulfenyl halide radical is attached to an aromatic hydrocarbon or halogenated aromatic hydrocarbon radical react readily with α,β-olefinic aldehydes.

The presently preferred olefinic aldehydes are α,β-olefinic aldehydes of the formula RCH=CCHO
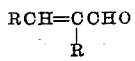

where each R is selected from hydrogen and hydrocarbon radicals free of aliphatic unsaturation and containing from 1 to 6 carbon atoms, provided that at least one R is hydrogen. Acrolein, where each R represents hydrogen, is a particularly preferred member of this series, for reasons of low cost, ready availability and high reactivity; also readily susceptible to the present reaction are the α,β-olefinic aldehydes containing a terminal methylene group, such as methacrolein, 2-ethylacrolein, 2-butylacrolein, 2-isopentylacrolein, 2-neopentylacrolein, 2-phenylacrolein, etc. An additional class of the presently useful olefinic aldehydes comprises β-substituted acroleins, such as crotonaldehyde, cinnamaldehyde, 3-cyclohexylacrolein, etc.

The presently useful sulfenyl halides are of the formula R"SX, where R" represents an aromatic hydrocarbon or halogenated aromatic hydrocarbon radical attached to the sulfenyl halide radical by a nuclear carbon atom, and X represents a halogen atom. By an aromatic radical is herein denoted a radical containing a benzene nucleus, which may be attached to or fused with another benzene ring or may be substituted by hydrocarbon radicals, e.g., alkyl radicals. In the process of the invention, it is preferred that the aromatic radicals of such sulfenyl halides should be hydrocarbon or halogenated hydrocarbon radicals free of aliphatic, i.e., olefinic or acetylenic, carbon-to-carbon, unsaturation and containing up to 12 carbon atoms. While chlorine is the preferred halogen substituent in the sulfenyl halides used in the process of the invention, it is also possible to employ bromo- or iodo substituents either on the hydrocarbon radical or in the sulfenyl halide portion of the molecule as subsitutes for chlorine; the halogen fluorine is generally less reactive and may be present as a substituent in the hydrocarbon portion of the sulfenyl halide radical but is not preferred as the sulfenyl halide halogen. One class of sulfenyl halides which may be employed in the reaction of this invention comprises aromatic sulfenyl halides wherein the sulfenyl halide radical is attached to a nuclear carbon atom of an aromatic hydrocarbon radical containing from 1 to 2 benzene rings, e.g., benzenesulfenyl chloride, p-toluenesulfenyl chloride, o-toluenesulfenyl chloride, xyl-enesulfenyl chloride, p-isopropylbenzene sulfenyl bromide, 2,4-diethybenzene sulfenyl chloride, 2-methyl-4-ethylbenzenesulfenyl iodide, naphthalene-1-sulfenyl chloride, 4-biphenyl-1-sulfenyl chloride, tetrahydronaphthalenesulfenyl chloride, etc.

Halogenated aromatic sulfenyl halides are also reactive with aldehydes in accordance with the process of this invention. One such class of halogenated sulfenyl halides comprises: halobenzenesulfenyl halides such as 2-, 3- and 4-chlorobenzenesulfenyl chloride, 3,4-dichlorobenzenesulfenyl chloride, 2,4-dichlorobenzenesulfenyl chloride, 2,4,5-trichlorobenzenesulfenyl chloride, 4-bromobenzenesulfenyl chloride, 4-fluorobenzenesulfenyl chloride, 3-bromo-4-chlorobenzenesulfenyl chloride, pentachlorobenzenesulfenyl chloride, etc. Another class of the presently useful sulfenyl chlorides comprises halogenated alkaryl sulfenyl halides, such as 3-chloro-4-methylbenzenesulfenyl chloride, 2-chloro-4-methylbenzenesulfenyl chloride, 2-chloro-4-isopropylbenzenesulfenyl chloride, 3-bromo-4-t-butylbenzenesulfenyl chloride, 3-chloro-4-neopentylbenzenesulfenyl chloride, etc.; and further, haloalkarylsulfenyl halides, such as chloromethylbenzenesulfenyl chlorides, trichloromethylbenzenesulfenyl chlorides, 3-chloro-4-chloromethylbenzenesulfenyl chloride, 2,4-bis-α-chloroethylbenzenesulfenyl chloride, 4-hexachloropentylbenzenesulfenyl chloride, etc. A further class of halogenated aromatic sulfenyl halides wherein the sulfenyl halide radical is attached to an aromatic nuclear carbon atom comprises the polycyclic sulfenyl halides, such as 5-naphthalenesulfenyl bromide, 4-chloronaphthalenesulfenyl chloride, 5,8-dichloronaphthalenesulfenyl chloride, trichloronaphthalenesulfenyl choride, 4'-chloro-4-biphenylsulfenyl chloride, hexachlorobiphenylsulfenyl chloride, etc.

When a sulfenyl halide as defined above is contacted with one of the presently useful class of olefinically unsaturated aldehydes there is formed a reaction product comprising compounds containing sulfur atoms and aldehyde radicals. The reaction is believed to proceed as illustrated by the following equation:

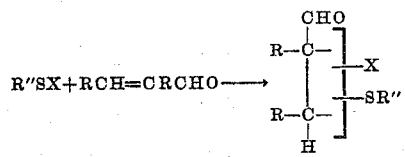

where R, R" and X are as defined hereinabove. From theoretical considerations based on the directive influence of the substituents, the halogen atom attached to the sulfur atom of the sulfenyl halide radical could be expected to add to the β-carbon atom of the aldehyde and the substituted thio radical could be expected to add to the α-carbon atom thereof. Alkyl substituents in the α-position on the present aldehyde may favor addition in this direction. However, the formation of 2-halo-3-thio aldehydes or a mixture of the two possible position isomers is not excluded.

The present process whereby adducts of the above structure are obtained is particularly valuable since aldehydes simultaneously substituted by a halogen atom and a substituted thio radical do not appear to have been known hitherto.

Our present products having the adduct structure as shown above may be characterized as 3(2)-halo-2(3)-(substituted-thio)alkane aldehydes, where by such nomenclature is meant a 3-halo-2-(substituted-thio)alkane aldehyde and/or a 2-halo-3-(substituted-thio)alkane aldehyde. Thus, the adduct of p-toluenesulfenyl chloride and acrolein in accordance with this invention is named as 3(2) - chloro - 2(3)-(4-methylphenylthio)propionaldehyde, whereby is meant 3-chloro-2-(4-methylphenylthio)- propionaldehyde and/or 2-chloro-3-(4-methylphenylthio)propionaldehyde.

Exemplary of the adducts which may be obtained from olefinic aldehydes and aromatic sulfenyl halides in accordance with this invention are adducts of acrolein with hydrocarbon sulfenyl halides such as 3(2)-chloro-2(3)-(phenylthio)propionaldehyde,
3(2)-chloro-2(3)-(4-methylphenylthio)propionaldehyde,
3(2)-bromo-2(3)-(xylylthio)propionaldehyde,
3(2)-chloro-2(3)-(4-isopropylphenylthio)propionaldehyde,
3(2)-iodo-2(3)-(2,4-diethylphenylthio)propionaldehyde,
3(2)-chloro-2(3)-(4-biphenylthio)propionaldehyde,
3(2)-chloro-2(3)-(naphthylthio)propionaldehyde, etc.

By reaction of acrolein with halogenated aromatic sulfenyl halides, there may be formed adducts such as 3(2)-chloro-2(3)-(4-chlorophenylthio)propionaldehyde,
3(2)-bromo-2(3)-(dichlorophenylthio)propionaldehyde,
3(2)-chloro-2(3)-(pentachlorophenylthio)propionaldehyde,
3(2)-chloro-2(3)-(3-bromo-4-chlorophenylthio)propionaldehyde,
3(2)-chloro-2(3)-(2-chloro-4-methylphenylthio)propionaldehyde,
3(2)-chloro-2(3)-(chloromethylphenylthio)propionaldehyde,
3(2)-chloro-2(3)-(trichloronaphthylthio)propionaldehyde,
3(2)-chloro-2(3)-(hexachlorobiphenylthio)propionaldehyde, etc.

The adducts of β-hydrocarbyl-substituted acroleins with the presently useful sulfenyl halides are exemplified by 3(2)-chloro-2(3)-(4-methylphenylthio)butyraldehyde,
3(2)-chloro-2(3)-(phenylthio)-3-phenylpropionaldehyde,
3(2)-chloro-2(3)-(xylylthio)-3-cyclohexylpropionaldehyde, etc.

A further class of adducts of the above formula comprises those derived from α-hydrocarbyl-substituted α,β-olefinically unsaturated aldehydes. Illustrative of adducts of such aldehydes with hydrocarbyl sulfenyl halides are 3(2)-bromo-2(3)-(phenylthio)-2-methylpropionaldehyde,
3(2)-chloro-2(3)-(tolylthio)-2-methylpropionaldehyde,
3(2)-chloro-2(3)-(xylylthio)-2-methylpropionaldehyde,
3(2)-chloro-2(3)-(naphthylthio)-2-ethylpropionaldehyde,
3(2)-chloro-2(3)-(4-biphenylthio)-2-methylpropionaldehyde,
3(2)-chloro-2(3)-(cyclohexylthio)-2-methylpropionaldehyde, etc.

Exemplary of adducts of α-substituted aldehydes with halogenated sulfenyl halides in accordance with this invention are 3(2)-chloro-2(3)-(4-chlorophenylthio)-2-methylpropionaldehyde,
3(2)-chloro-2(3)-(4-chlorophenylthio)-2-phenylpropionaldehyde,
3(2)-chloro-2(3)-(3-bromo-4-chlorophenylthio)-2-butylpropionaldehyde,
3(2)-chloro-2(3)-(4-fluorophenylthio)-2-methylpropionaldehyde,
3(2)-chloro-2(3)-(pentachlorophenylthio)-2-methylpropionaldehyde,
3(2)-chloro-2(3)-(3-chloro-4-methylphenylthio)-2-methylpropionaldehyde,
3(2)-chloro-2(3)-(chloromethylphenylthio)-2-phenylpropionaldehyde,
3(2)-chloro-2(3)-(hexachlorobiphenylthio)-2-methylpropionaldehyde,
3(2)-chloro-2(3)-(trichlorobiphenylthio)-2-pentylpropionaldehyde, etc.

It will be appreciated that these adducts contain an asymmetric carbon atom, and each position isomer is obtained as a racemic mixture of optical isomers which may be resolved into d- and l-isomers. By the above nomenclature, it is intended to designate the individual optical isomers of the named aldehydes as well as the racemic mixtures thereof.

Although the present reaction products are believed to contain adducts as described hereinabove, there are also apparently present therein additional thio-substituted aldehydes not having the adduct structure and possibly resulting from secondary reactions, and the present adducts have proved refractory to attempted isolation thereof. The establishment of a structure for the present products is complicated by pronounced reactivity of the aldehyde function, and the complex reaction mixtures obtained in accordance with the present invention are difficult to separate into the individual products. Accordingly, we prefer not to be bound by speculation as to the nature of the presently provided reaction products, but to claim the present reaction products as such as new compositions of matter.

In carrying out the present reaction, one of the presently useful sulfenyl halides is simply contacted with an olefinic aldehyde of the above formula until the reaction is complete. In the formation of the presently claimed products there are consumed equimolecular amounts of sulfenyl halide and aldehyde reactants, to form a reaction product comprising compounds containing sulfur atoms and aldehyde radicals. If desired, an excess of one component may be present in the reaction mixture to serve, e.g., as a reaction diluent. The rapidity of the reaction varies with the reactants chosen; in some cases the reaction is exothermic and requires cooling and/or diluents to moderate its violence, while other pairs of reactants do not react completely until after refluxing at elevated temperatures. Suitable inert solvents and diluents which may be employed in the reaction mixture, if desired, include hydrocarbons, such as benzene or hexane, halogenated solvents, such as chloroform or ethylene dibromide, oxygenated solvents free of active hydrogen, such as ether, etc. A particularly preferred class of solvents are anhydrous carboxylic acids, e.g., glacial acetic acid; this solvent has the advantage of acting as the catalyst for the reaction. Mixtures of carboxylic acids and solvents may also be used as the reaction medium if desired.

To accelerate the rate of reaction when desired, heating and catalysts are employed. Suitable temperatures for carrying out the reaction comprise, e.g., the reflux temperatures of the reaction mixture. The use of catalysts is not necessary but may be advantageous in some circumstances. Exemplary of catalysts which may be used in the present reaction, besides glacial acetic acid as mentioned above, are, e.g., acid catalysts such as a boron trifluoride complex Friedel-Crafts catalyst. Pressure variation may also be utilized to facilitate the conduct of the reaction, e.g., by carrying out the reaction in a pressure resistant vessel under autogenous pressure and at elevated temperatures.

Since the present olefinic compounds, particularly those containing a terminal methylene group, are susceptible to thermal polymerization, the reaction is preferably conducted in the presence of polymerization inhibitors. Examples of suitable polymerization inhibitors are, e.g., hydroquinone, the monomethyl ether of hydroquinone, methylene blue, copper carbonate, selenium dioxide, etc.

The time required to accomplish the reaction depends on functional factors such as the reactivity of the α,β- olefinic aldehyde and the sulfenyl halide, the temperature of reaction, the presence or absence of catalyst, etc. Reaction rates and times of reaction may vary considerably, also depending on details of apparatus and other operational conditions. By modification of the apparatus continuous procedures may be substituted for the batch-type operation described below.

Conveniently the course of the reaction may be followed by observing the change in color of the reaction mixture. Sulfenyl halides are generally a deep red shade; as the reaction with the aldehyde proceeds, the color of the reaction mixture generally lightens, gradually reaching a clear yellow-orange tone by the time the sulfenyl halide is reacted.

On completion of the reaction the product may be separated by conventional methods, e.g., by vaporization, distillation, extraction, etc.

As illustrative of the process of the invention there is described the following non-limiting exemplary operations.

Example 1

To 11.2 g. (0.2 mole) of acrolein in 100 ml. of dry benzene were added 31.7 g. (0.2 mole) of p-toluenesulfenyl chloride. An exothermic reaction occurred with the temperature rising slowly to 70° C. and the color changing from red to orange. Removal of the benzene solution from the reaction mixture left the reaction product as an orange oil.

Example 2

To 22.4 g. (0.4 mole) of acrolein in 100 ml. of glacial acetic acid were added 31.7 g. (0.2 mole) of p-toluenesulfenyl chloride. There was an immediately exothermic reaction and an ice bath was used to hold the reaction mixture below 50° C. After 10 minutes the acetic acid and acrolein were stripped off under vacuum leaving the reaction product of p-toluenesulfenyl chloride and acrolein as an orange oil weighing 32.2 g., $n_D^{25}$ 1.5660. Elementary analysis of the reaction product gave the following results: percent C, 57.888; percent H, 5.96; percent Cl, 11.35, percent S, 14.12.

On contacting methacrolein and p-chlorobenzenesulfenyl chloride in the presence of acetic acid an immediate exothermic reaction occurs to form a reaction product comprising compounds containing sulfur and carboxylic aldehyde radicals; by heating cinnamaldehyde with p-chlorobenzenesulfenyl chloride in the presence of glacial acetic acid there is obtained a sulfur-containing aldehyde product, etc.

The presently provided reaction products of sulfenyl halides with aldehydes of the above formula are complex mixtures, the composition of which has not been precisely established. The reaction products of the invention are adapted to be employed as the active constituents of the compositions for the control of bacteria and fungi; this utility is illustrated by incorporating the reaction product of p-toluenesulfenyl chloride with acrolein in sterile agar at a concentration of about 0.1% whereby the agar is rendered incapable of supporting the growth of fungal species such as *Aspergillus niger* when inoculated therewith. The present reaction products may also be used for the control of other undesirable pest species such as nematodes, insects, weeds, etc. For use as biological toxicants the present reaction products may be applied directly to the undesirable pest life or the locus thereof, or they may be admixed with surface active agents, with or without the addition of organic solvents, to prepare toxic compositions which can be diluted with water for application as aqueous dispersions or emulsions to pest habitats or pest species, or they may be admixed with inert finely-divided powders for such application.

It is also contemplated that the presently provided sulful-containing reaction products of α,β-olefinic aldehydes with aromatic, including halogenated aromatic, sulfenyl halides may be converted by oxidation (e.g. with hydrogen peroxide in acetic acid, potassium permanganate, chromic acid, etc.) into the corresponding sulfoxides and sulfones.

While the present invention has been illustrated with reference to specific materials and processes it will be appreciated that other embodiments of the invention may be made as defined in the appended claims.

What is claimed is:

1. A mixture of isomers of the formula

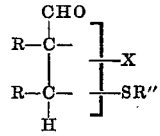

wherein R is selected from the class consisting of hydrogen and hydrocarbon radicals free of aliphatic unsaturation and containing from 1 to 6 carbon atoms R" is an aromatic radical selected from the class consisting of hydrocarbon radicals and halogenated hydrocarbon radicals free of aliphatic unsaturation and containing up to 12 carbon atoms, and X is selected from the class consisting of chlorine and bromine.

2. The compound of claim 1, wherein X is chlorine and said aromatic radical is monocyclic.

3. A mixture of isomers of the formula

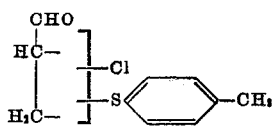

4. A mixture of isomers of the formula

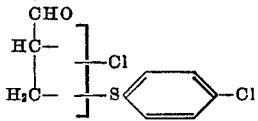

5. The method which comprises contacting a sulfenyl halide of the formula R"SX, wherein X is selected from the class consisting of chlorine and bromine and R" is an aromatic radical attached to the sulfenyl halide radical by a nuclear carbon atom and selected from the class consisting of hydrocarbon radicals and halogenated hydrocarbon radicals, said aromatic radicals being free of aliphatic unsaturation and containing up to 12 carbon atoms, with an α,β-olefinically unsaturated aldehyde of the formula: RCH=CRCHO, where each R is selected from the class consisting of hydrogen and hydrocarbon radicals free of aliphatic unsaturation and containing from 1 ot 6 carbon atoms, provided that at least one R represents hydrogen, and thereby forming a reaction product of the formula

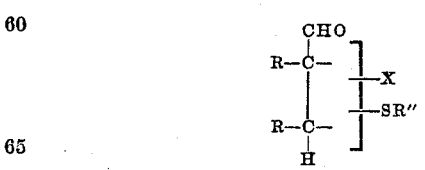

wherein R, R" and X are as defined hereinabove.

6. The method of claim 1 wherein X is chlorine and said aromatic radical is monocyclic.

7. The method of claim 6 wherein said reaction is carried out in the presence of glacial acetic acid.

8. The method of claim 7 wherein said sulfenyl halide is p-toluenesulfenyl chloride and said aldehyde is acrolein.

9. The method of claim 7 wherein said sulfenyl halide is p-chlorobenzenesulfenyl chloride and said aldehyde is acrolein.

References Cited in the file of this patent

UNITED STATES PATENTS

| | | |
|---|---|---|
| 2,461,013 | Vinton | Feb. 8, 1949 |
| 2,809,997 | Johnston | Oct. 15, 1957 |

OTHER REFERENCES

Hutchison et al.: Ber. Deut. Chem., vol. 47, pages 805–7 (1914).

Lecher et al.: Ber. Deut. Chem., vol. 58, page 414 (1925).

Turner et al.: J. Am. Chem. Soc., vol. 69, pages 1009–12 (1947).